United States Patent
Chen et al.

(10) Patent No.: US 7,864,262 B2
(45) Date of Patent: Jan. 4, 2011

(54) SUPPORTING BRACKET

(75) Inventors: Yun-Lung Chen, Taipei Hsien (TW);
Zhong-Hai Zhang, Shenzhen (CN);
Fa-Ming Jiang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 105 days.

(21) Appl. No.: 12/241,633

(22) Filed: Sep. 30, 2008

(65) Prior Publication Data

US 2010/0002165 A1 Jan. 7, 2010

(30) Foreign Application Priority Data

Jul. 7, 2008 (CN) .................. 2008 2 0301459

(51) Int. Cl.
*G02F 1/1333* (2006.01)
*H05K 7/14* (2006.01)

(52) U.S. Cl. .................. 349/58; 349/60; 248/917; 248/919; 361/679.21

(58) Field of Classification Search .................. None
See application file for complete search history.

(56) References Cited

U.S. PATENT DOCUMENTS

| | | | | |
|---|---|---|---|---|
| 5,715,138 | A | * | 2/1998 | Choi ................. 361/679.21 |
| 6,354,552 | B1 | * | 3/2002 | Chiu ..................... 248/422 |
| 6,766,994 | B2 | * | 7/2004 | Serbinski et al. ........... 248/371 |
| D505,134 | S | * | 5/2005 | Serbinski et al. .......... D14/451 |
| 7,124,984 | B2 | * | 10/2006 | Yokouchi et al. ......... 248/125.8 |
| 7,249,739 | B2 | * | 7/2007 | Chueh et al. .............. 248/133 |
| 7,490,804 | B2 | * | 2/2009 | Oh et al. ................. 248/278.1 |
| 2006/0171105 | A1 | * | 8/2006 | Hsiao ..................... 361/681 |
| 2009/0283654 | A1 | * | 11/2009 | Hu ........................ 248/448 |

* cited by examiner

*Primary Examiner*—Michelle R Connelly Cushwa
(74) *Attorney, Agent, or Firm*—Clifford O. Chi

(57) ABSTRACT

A supporting bracket for adjusting tilt of a liquid crystal display (LCD) includes a fixing member configured for supporting the LCD, a gear capable of rotating in the fixing member, and a sliding member received in the fixing member configured for connecting to the LCD. The sliding member comprises a rack to engage with teeth of the gear. The gear rotates to drive the sliding member moving relative to the fixing member to adjusting the angle of the LCD.

6 Claims, 6 Drawing Sheets

SUPPORTING BRACKET

BACKGROUND

1. Technical Field

The present invention relates to a supporting bracket for supporting a liquid crystal display (LCD).

2. Description of Related Art

A liquid crystal display (LCD) is typically connected to a base via a rotatable supporting bracket to adjust the elevation, horizontal position, and tilt of the LCD. A typical supporting bracket requires a locating mechanism to locate the LCD to a special position. The locating mechanism has a complex structure which increases the cost of the supporting bracket. In addition, the typical supporting bracket needs to co-operate with the base, which takes up additional space.

Therefore, a new supporting bracket for supporting a liquid crystal display (LCD) is desired to overcome the above-described deficiencies.

DETAILED DESCRIPTION OF THE EMBODIMENTS

Figure 1:
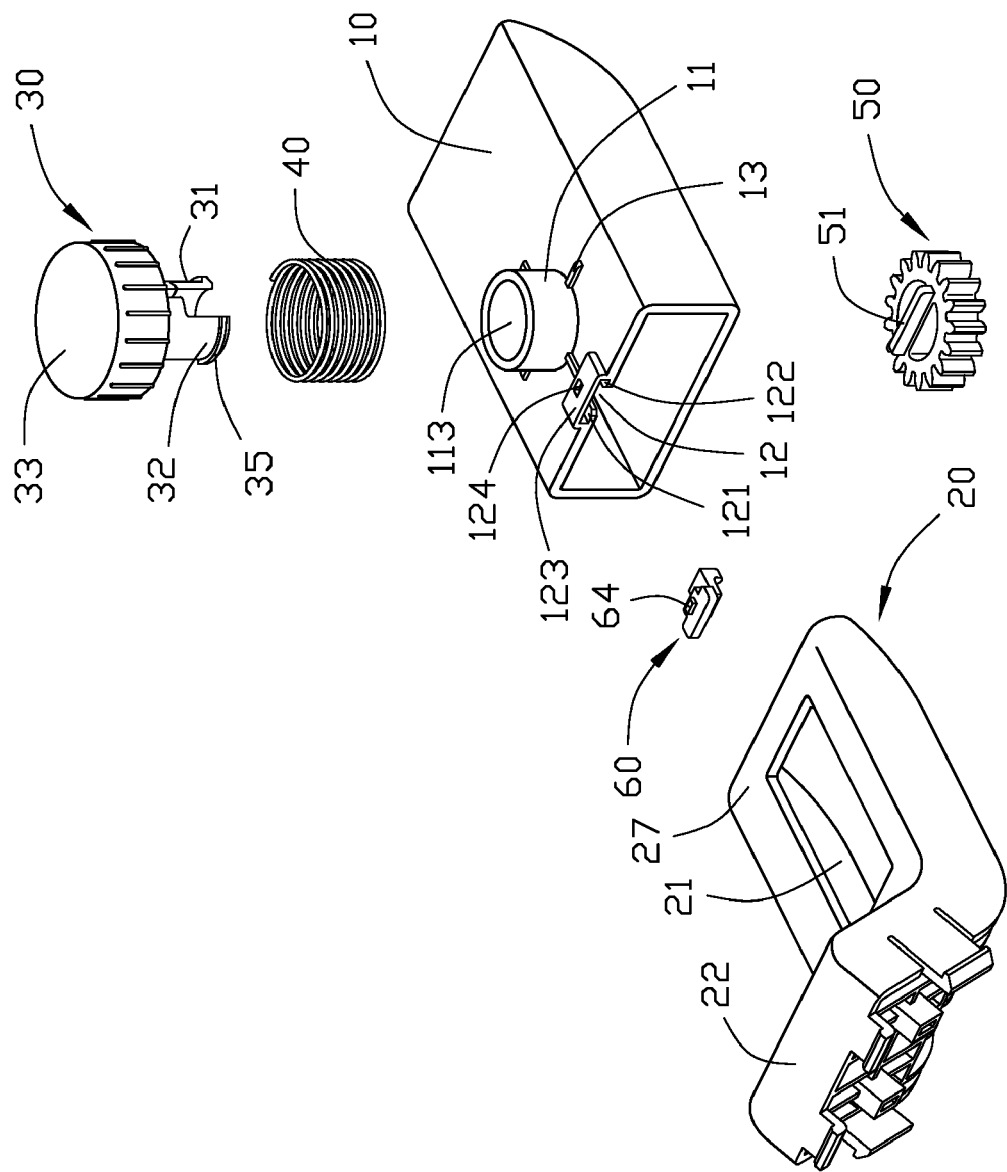
FIG. 1 is an exploded view of an embodiment of a supporting bracket for supporting a LCD, the supporting bracket including a fixing member, a sliding member, an adjusting member, a spring, a gear, and a fastening member.
Figure 2:
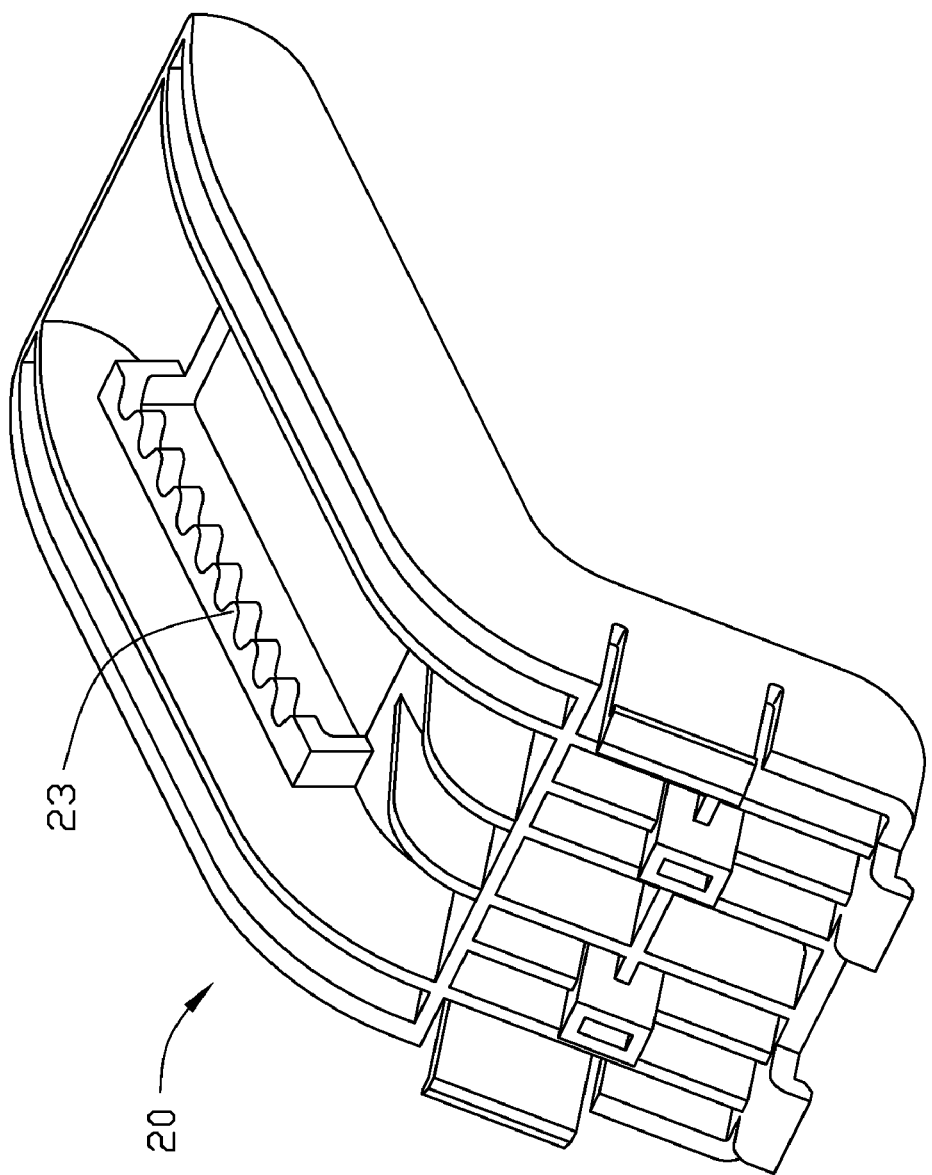
FIG. 2 is an isometric view of a fixing member of the supporting bracket of FIG. 1.

Referring to FIGS. 1 and 2, an embodiment of a supporting bracket for adjusting an angle of a liquid crystal display (LCD) includes a fixing member 10, a sliding member 20, an adjusting member 30, a spring 40, a gear 50, and a fastening member 60.

The fixing member 10 defines an opening into a cavity of the fixing member 10 in a proximal end of the fixing member 10. The fixing member 10 has an arcuate portion at a distal end. A ring-shaped outlet 11 and an accommodating area 12 is formed on a top wall of the fixing member 10. The cavity also communicates outside the fixing member 10 through an opening 113 defined in the ring-shaped outlet 11. Four linear protrusions 13 positioned on the top wall of the fixing member 10 extend from the ring-shaped outlet 11. The accommodating area 12 includes two arms 121, 122, and a top wall 123 cooperatively defining an accommodating space. A square opening 124 is defined in the top wall 123 of the accommodating area 12.

The sliding member 20 includes a connecting portion 22 for connecting to an LCD, and a sliding portion 27 for accommodating in the cavity of the fixing member 10. The sliding portion 27 includes a rectangular opening 21 defined therein, and a rack 23 positioned on a side of the opening 21 for engaging with the gear 50. A plurality of connecting pieces (not labeled) is positioned at the connecting portion 22 for connecting to the LCD.

The adjusting member 30 includes a round knob 33 and two elastic slices 31, 32 extending from the round knob 33. The two elastic slices 31, 32 form a cutout therebetween, and a protrusion 35 at a lower portion of the elastic slices 31, 32.

The gear 50 is ring-shaped, and includes a supporting portion 51 in a middle portion configured to engage with the adjusting member 30.

Figure 3:
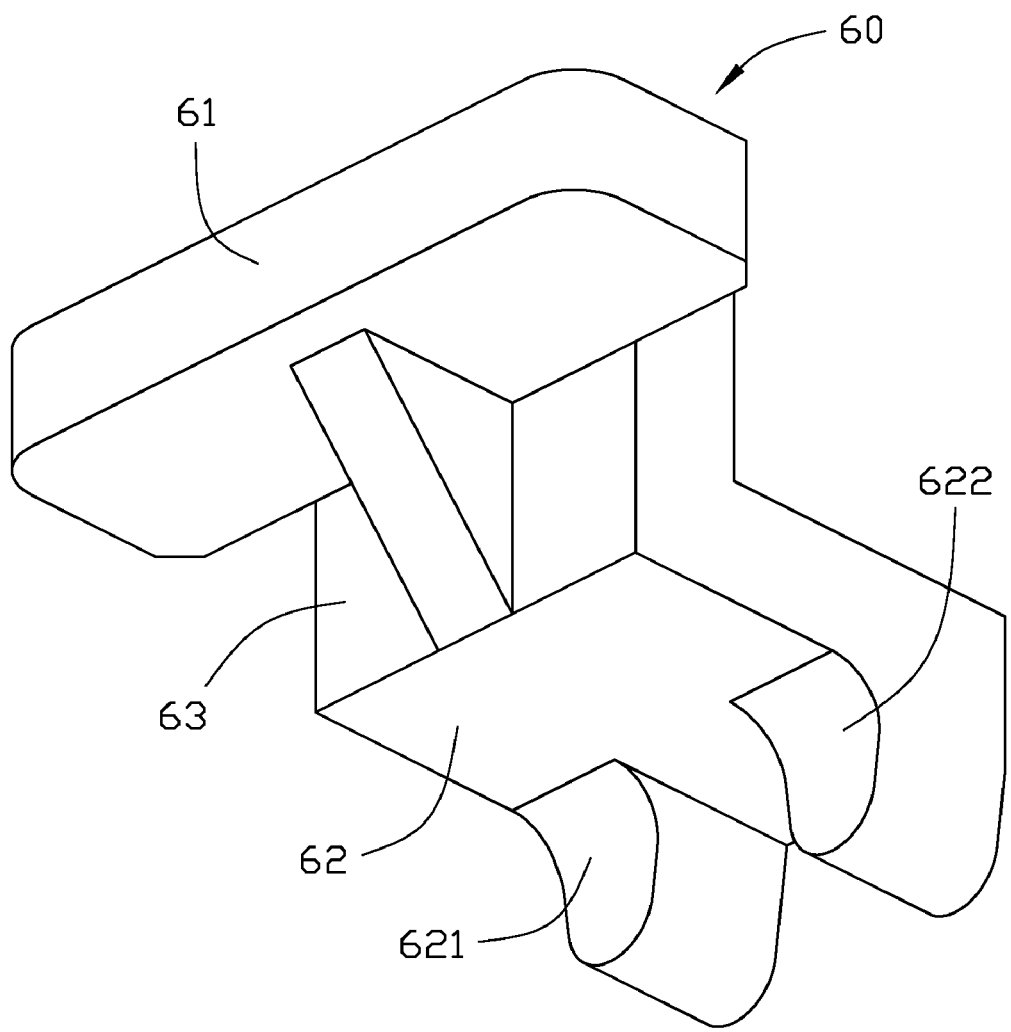
FIG. 3 is an isometric view of a fastening member of the supporting bracket of FIG. 1.

Referring to FIG. 3, the fastening member 60 includes an upright connecting portion 63. A top wall 61 extends horizontally from a top edge of the connecting portion 63. A bottom wall 62 extends horizontally from a bottom edge of the connecting portion 63 in a direction opposite to the top wall 61. A rectangular protrusion 64 extends vertically from a top surface of the top wall 61. Two separate protrusions 621, 622 extend vertically from a bottom surface of the bottom wall 63.

Figure 4:
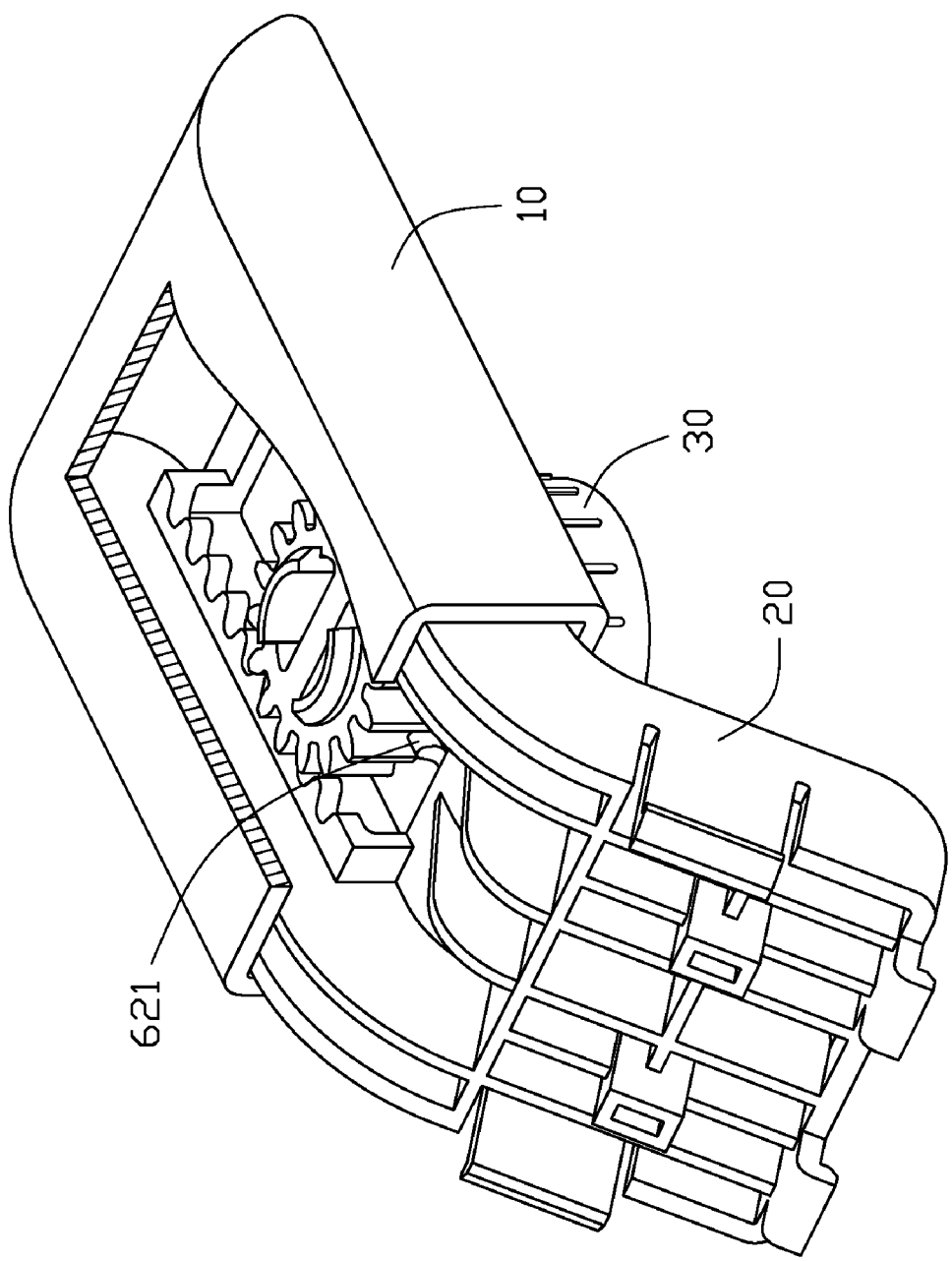
FIG. 4 is an assembled view of the supporting bracket of FIG. 1 in one state.
Figure 5:
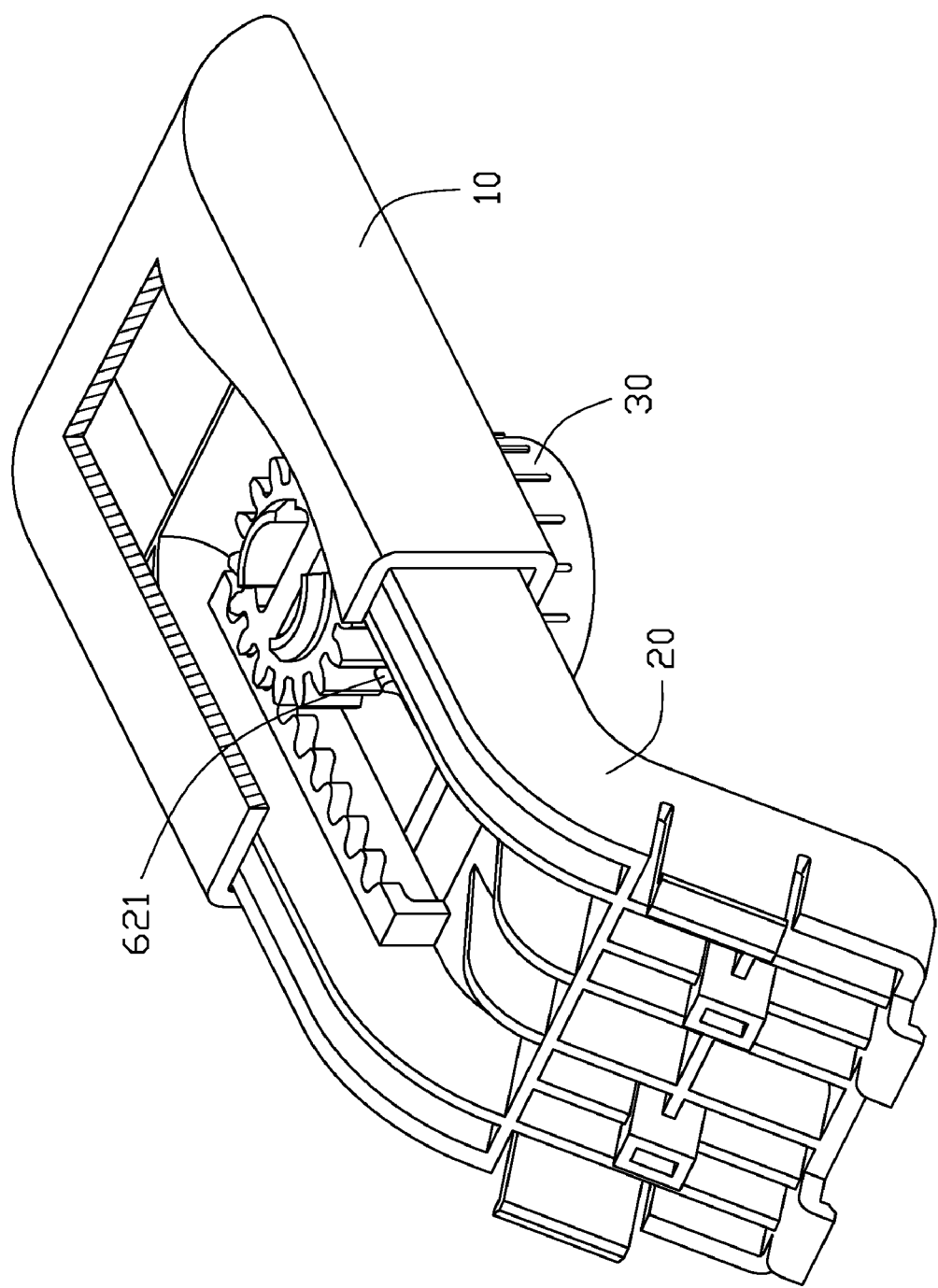
FIG. 5 is an assembled view of the supporting bracket of FIG. 1 in another state.
Figure 6:
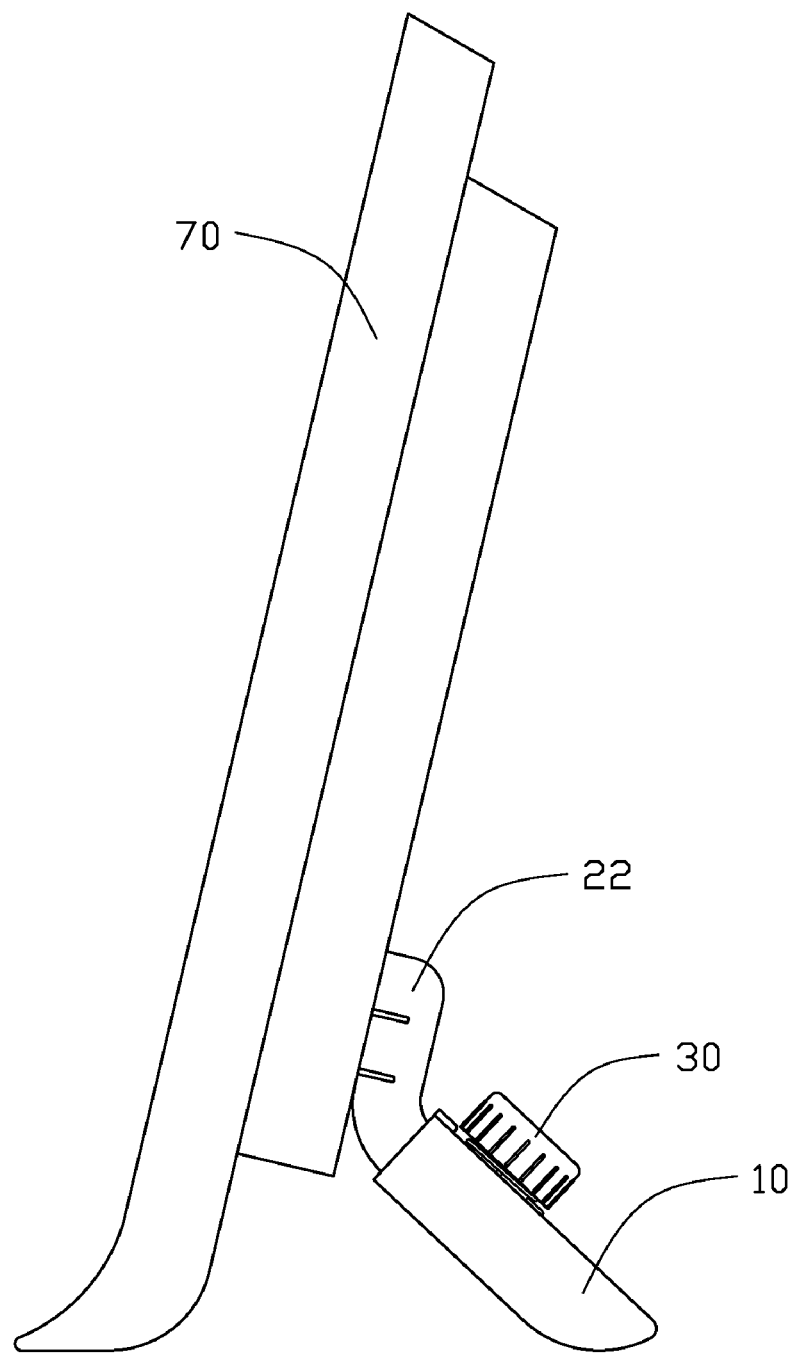
FIG. 6 is a view of the supporting bracket of FIG. 1 assembled to an LCD.

Referring to FIGS. 4 through 6, in assembly, the gear 50 is installed on the rack 23 of the sliding member 20. The sliding portion 27 of the sliding member 20 is received in the cavity of the fixing member 10. The spring 40 is installed on the linear protrusions 13 on the top wall of the fixing member 10. The elastic slices 31, 32 are compressed to elastically deform to extend through the opening 113 and engage with the gear 50. The knob 33 is pressed to move toward the gear 50 until the elastic slices 31, 32 reach a bottom edge of the gear 50. The elastic slices 31, 32 elastically returns to a normal state and the adjusting member 30 becomes fastened on the gear 50 via the protrusion 35 resisting against the bottom edge of the gear 50. The supporting portion 51 of the gear 50 is received in the cutout of the adjusting member 30. The fastening member 60 is pushed to move towards the accommodating area 12. The arms 121, 122 of the accommodating area 12 are compressed to elastically deform by the top wall 61 of the fastening member 60 until the protrusion 64 on the top surface of the top wall 61 is received in the opening 124 on the top wall 123 of the accommodating area 12, and the arms 121, 122 elastically returns to a normal state. A tooth of the gear 50 will become blocked between the protrusions 621, 622 to prevent the gear 50 from rotating freely in the fixing member 10.

In use, the bottom of the connecting portion 22 of the sliding member 20 is connected to the back of an LCD 70, the arcuate portion of the fixing member 10 is placed on a surface such as a desk. To adjust the angle of the LCD 70, the adjusting member 30 is pressed to move towards the fixing member 10, thereby compressing the spring 40 until the gear 50 is released from the protrusions 621, 622. The knob 33 is rotated to drive the gear 50 to move along the rack 23. The sliding member 20 moves relative to the fixing member 10 until a desired length of the supporting bracket is adjusted thereby changing the angle of the LCD 70. When a desired angle is obtained, the adjusting member 30 is released and the tooth of the gear 50 is engaged with the protrusions 621, 622 to prevent the gear 50 from rotating along the rack 23.

It is to be understood, however, that even though numerous characteristics and advantages of the embodiments have been set forth in the foregoing description, together with details of the structure and function of the embodiments, the disclosure is illustrative only, and changes may be made in detail, especially in matters of shape, size, and arrangement of parts within the principles of the embodiments to the full extent indicated by the broad general meaning of the terms in which the appended claims are expressed.

What is claimed is:

1. A supporting bracket for adjusting an angle of a liquid crystal display (LCD) comprising:
   a fixing member configured for supporting the LCD;
   a gear capable of rotating in the fixing member; and a sliding member received in the fixing member configured for connecting to the LCD;

wherein the sliding member comprises a rack to engage with the gear; the gear rotates to drive the sliding member moving relative to the fixing member to adjust the angle of the LCD; the fixing member defines an opening into a cavity of the fixing member in a proximal end of the fixing member; the fixing member has an arcuate portion at a distal end of the fixing member; the fixing member comprises a ring-shaped outlet and an accommodating area on a top wall of the fixing member; the cavity communicates to outside the fixing member through an opening defined in the ring-shaped outlet.

2. The supporting bracket of claim 1, wherein the sliding member comprises a connecting portion for connecting to the LCD, and a sliding portion for slidably moving in the cavity of the fixing member; a rectangular opening is defined in the sliding portion; the rack is positioned on a side of the rectangular opening.

3. The supporting bracket of claim 2, further comprising a fastening member received in the accommodating area, the fastening member comprises an upright connecting portion; a top wall extends from a top edge of the connecting portion; a bottom wall extends from a bottom edge of the connecting portion in a direction opposite to the top wall; a rectangular protrusion extends from a top surface of the top wall; two separate gear protrusions extend from a bottom surface of the bottom wall; the accommodating area comprises two arms and a top wall cooperatively defining an accommodating space; a square opening is defined in the top wall of the accommodating area; the rectangular protrusion is received in the square opening.

4. The supporting bracket of claim 3, wherein the gear is ring-shaped, and comprises a supporting portion in a middle portion configured to engage with the adjusting member; a tooth of the gear is removably fixed between the two gear protrusions of the fastening member.

5. The supporting bracket of claim 4, further comprising an adjusting member engaging with the gear through an opening defined in the gear, the adjusting member comprises a round knob and two elastic slices extending from the round knob, a cutout is defined between the elastic slices, a protrusion is formed at a lower portion of the elastic slices.

6. The supporting bracket of claim 5, further comprising a spring positioned between the fixing member and the adjusting member; the fixing member further comprising four linear protrusions positioned on the top wall and extending from the ring-shaped outlet for supporting the spring.

* * * * *